(12) United States Patent
Dujardin et al.

(10) Patent No.: US 6,754,281 B1
(45) Date of Patent: Jun. 22, 2004

(54) PROGRAMMABLE DIGITAL DEMODULATOR FOR OFDM MODULATIONS

(75) Inventors: Eric Dujardin, Paris (FR); Olivier Gay-Bellile, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/568,287

(22) Filed: May 10, 2000

(30) Foreign Application Priority Data

May 11, 1999 (FR) ............................................. 99 06018

(51) Int. Cl.[7] ................................................. H04L 5/12
(52) U.S. Cl. ....................... 375/260; 375/324; 375/340; 455/136; 455/190.1; 455/209; 455/214; 455/323
(58) Field of Search ................................ 375/260, 261, 375/324, 340; 329/301, 302, 305, 306, 316, 323, 348, 358; 455/131–133, 136, 190.1, 207, 214, 228, 255, 258, 318, 323, 334

(56) References Cited

U.S. PATENT DOCUMENTS

| | | | | |
|---|---|---|---|---|
| 4,709,344 A | * | 11/1987 | Crawford | .................. 708/312 |
| 5,970,046 A | * | 10/1999 | Takegahara et al. | ........ 370/203 |
| 5,995,483 A | * | 11/1999 | Marchok et al. | ............ 370/207 |

FOREIGN PATENT DOCUMENTS

| | | |
|---|---|---|
| EP | 0340978 A2 | 11/1989 |
| EP | 0353890 A2 | 2/1990 |

OTHER PUBLICATIONS

ETSI DVB Standard Project (Digital Video Broadcasting–Terrestrial).

* cited by examiner

Primary Examiner—Stephen Chin
Assistant Examiner—Dac V. Ha
(74) Attorney, Agent, or Firm—Peter Zawilski

(57) ABSTRACT

The invention relates to a digital demodulator whose architecture is adapted to multicarrier modulations (radio wave transmissions), but which remains suitable for use for monocarrier modulations (cable and satellite transmissions). With multicarrier modulations, the demodulator must carry out certain functions at a frequency of the order of sampling frequency and other functions at a frequency of the order of the symbol frequency. The invention comprises a separation of the architecture into three modules: a first module which carries out programs which are repeated with a first frequency, a second module capable of using programs which are repeated with a second frequency, and an interface module between the first and the second module. An advantage is that the memory size necessary for storing instructions for the first module is reduced. An application is for DVB standard transmission of digital TV programs.

12 Claims, 2 Drawing Sheets

PROGRAMMABLE DIGITAL DEMODULATOR FOR OFDM MODULATIONS

FIELD OF THE INVENTION

The invention relates to a transmission system comprising at least a transmitter and a receiver, said receiver comprising a digital data demodulator. The invention also relates to a receiver and a demodulator designed for use in such a system.

The invention has important applications in the field of digital modulations.

BACKGROUND OF THE INVENTION

The standardization project DVB-T (Digital Video Broadcasting-Terrestrial) as defined by the ETSI and relating to the distribution of digital TV programs by radio links describes an example of such a transmission system. In this project in particular multicarrier modulations which are used which renders it possible to use the characteristics of the transmission channel to the best advantage.

The use of multicarrier modulations leads to a particular problem. The multicarrier transmission technique consists in a frequency multiplexing of N carriers which are modulated by points of a constellation (for example, points of a QAM constellation). Each transmitted symbol (called FDM symbol, short for Frequency Division Multiplexing) thus corresponds to a block of N points, each point of the block modulating one of the N carriers. In the case of multicarrier transmissions, the sampling frequency of the transmitted signal is accordingly much higher than the frequency of the FDM symbols. At the demodulator level, certain demodulation functions are carried out at a frequency of the order of the sampling frequency of the received data, whereas other functions are carried out at a frequency of the order of the symbol frequency.

On the other hand, it is desirable to use a static communication model for managing the data exchanges inside such a demodulator. The use of a static communication model comprises the realization of given functions at given moments by executing programs which are repeated at one and the same frequency, so that data can be provided in a regular rhythm. This type of communication model is advantageous because it enables to guarantee that all the data are correctly transmitted and that accordingly the functions are correctly executed.

If the architecture of a demodulator for multicarrier modulations is a static architecture, the choice of the common repetition frequency must necessarily be the lowest frequency from among the frequencies which can be used, i.e. a frequency which is of the order of the symbol frequency. This means that a very large number of instructions must be stored in a memory. In particular, the instructions relating to the treatment of the various carriers will have to be stored as many times as there are carriers. This solution is extremely costly from a memory point of view.

SUMMARY OF THE INVENTION

The invention has for its object to provide a demodulator which provides a solution to this problem.

This object is achieved with a transmission system, a receiver, and a demodulator as described in the opening paragraphs which are characterized in that said demodulator comprises:

- a first module designed for carrying out first demodulation functions in accordance with at least one first program which is repeated with a first frequency,
- a second module capable of carrying out second demodulation functions in accordance with at least one second program which is repeated with a second frequency, and
- an interface module for exchanging data between said modules.

The invention thus provides a separation of the demodulator architecture into two parts which are in communication through an interface. In the case of multicarrier modulations, one of these parts (the first module) is designed for carrying out functions which must be performed at a frequency of the order of the sampling frequency. The other part (the second module) is designed for carrying out functions which must be performed at a frequency of the order of the symbol frequency. The operating programs of the first module have a repetition frequency of the order of the sampling frequency. Consequently, the instructions relating to the processing of the various carriers are only stored in a memory a minimum number of times. The necessary memory length for the storage of said programs is accordingly reduced to a minimum.

The invention furthermore provides the advantage that an architecture is created which can be used for transmission systems which use monocarrier modulations, for example for transmission systems by cable or by satellite. In this type of system, the sampling frequency and the symbol frequency are of the same order of magnitude such that the problem described above does not arise. In that case, only one of the modules is used (the first module). The operating programs of this module have a repetition frequency of the order of the symbol frequency.

BRIEF DESCRIPTION OF THE DRAWINGS

The invention will be better understood and further details will become apparent from the following description with reference to the annexed drawings, given by way of non-limitative example, in which.

DESCRIPTION OF PREFERRED EMBODIMENTS

Figure 1:
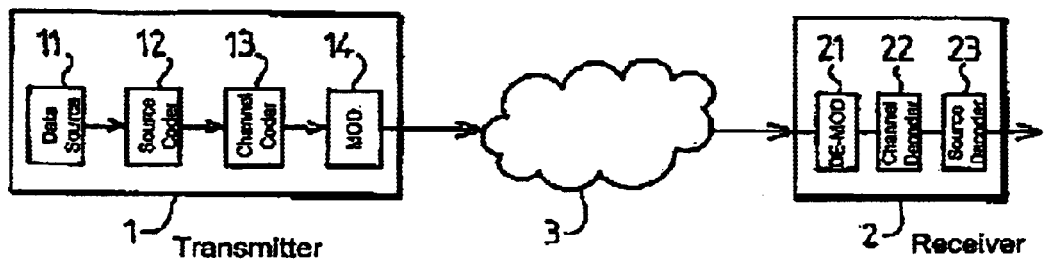
FIG. 1 shows an example of a transmission system according to the invention.

FIG. 1 shows an example of a digital transmission system according to the invention, showing a transmission between a transmitter 1 and a receiver 2 via a transmission medium 3. The transmitter 1 comprises a data source 11, a source coder 12, a channel coder 13, and a digital modulator 14.

The receiver 2 comprises a digital demodulator 21, a channel decoder 22, and a source decoder 23. The transmission medium 3 may be of various kinds, for example, it may be a cable network, a satellite channel, or a radio wave channel. The modulation used is chosen as a function of the transmission medium, taking into account to an optimum degree the characteristics of the transmission medium. In particular, monocarrier modulations will be used for cable and satellite transmissions, and multicarrier modulations for radio wave transmissions, because the technique of multicarrier modulation offers a good protection against the selectivity of the radio wave channels, the multipath propagation, and interferences between radio wave channels.

In the DVB-T standardization project as defined by the ETSI, the multicarrier modulations used are OFDM (Orthogonal Frequency Division Multiplexing) modulations. The OFDM technique consists in a frequency multiplexing of N orthogonal carriers which are modulated by points of a constellation. (for example, points of a QAM constellation). Each transmitted symbol (referred to as OFDM symbol) thus corresponds to a block of N points, each point of the block modulating one of the N orthogonal carriers.

Figure 2:
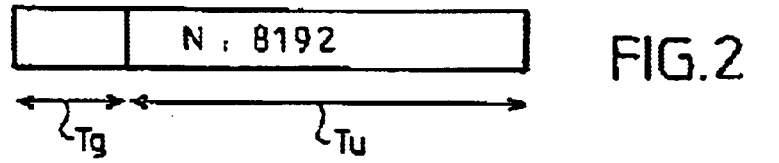
FIG. 2 shows the structure of an FDM symbol.

FIG. 2 shows the structure of an example of an OFDM symbol as defined in the DVB-T standardization project. Each symbol is composed of a guard interval Tg followed by a useful part Tu. The guard interval Tg serves to eliminate interferences between the symbols. The useful part comprises N=8192 samples. These 8192 samples correspond to 6817 useful carriers. Some of these 6817 useful carriers transport data and other ones transport control information. The nature of a carrier (useful carrier, data carrier or control information carrier) is determined by its position in the OFDM symbol. The control information carriers are used essentially for the synchronization and channel determination. Certain processes to be carried out on the carriers are thus carried out at a frequency of the order of the symbol frequency. By contrast, the processes to be carried out on the useful data carriers all take place at a frequency of the order of the sampling frequency.

Figure 3:
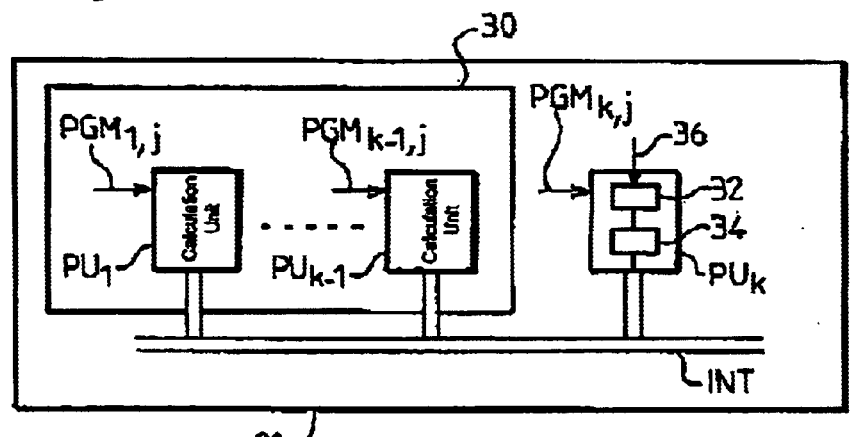
FIG. 3 is a diagram of the architecture of a digital demodulator according to the invention.

FIG. 3 shows a diagram of the basic architecture of a digital demodulator 21 according to the invention. The demodulator 21 comprises a plurality of calculation units $PU_i$ (i=1, . . . , K) controlled by programs $PGM_{i,j}$ (j=1, . . . , $L_i$) which are repeated with a first frequency. These calculation units $PU_i$ communicate with one another via an interconnection network INT.

Figure 4:
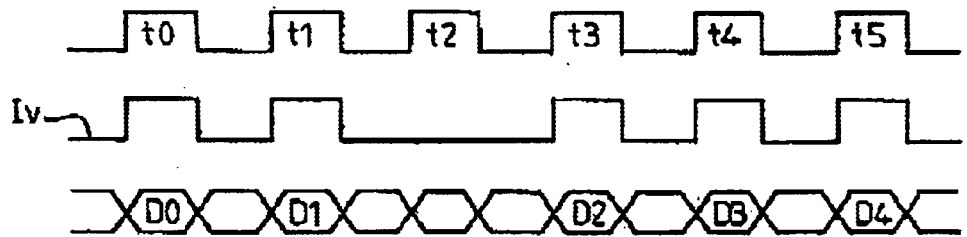
FIG. 4 is an explanatory diagram of the management of the internal communications in a demodulator as shown in FIG. 3.

The digital demodulator described here is a programmable demodulator which can be programmed so as to be used for different types of modulation. This implies in particular that the symbol frequency is not necessary known in advance. The architecture used being a static architecture, periodic communication moments (t0, t1, . . . ) are provided for transferring the data (D0, D1, . . . ) from one calculation unit to another (see FIG. 4), independently of the value of the symbol frequency. It may accordingly happen that no data is available when a communication must take place (for example, at moment t2). A validity indicator Iv is accordingly associated with each communication interval for informing the calculation unit which is expecting a data whether or not there will be a data in this communication time interval. At moment t2, for example, the validity indicator has a zero value because no data is available.

The calculation units $PU_i$ (i=1, . . . , K−1) form a first module 30. They carry out first demodulation functions in accordance with $PGM_{i,j}$ programs which are repeated with a first frequency. The calculation unit $PU_K$ comprises a second module 32 and an interface module 34. The second module 32 is capable of carrying out second demodulation functions in accordance with one or several programs 36 which are repeated with a second frequency.

Figure 5:
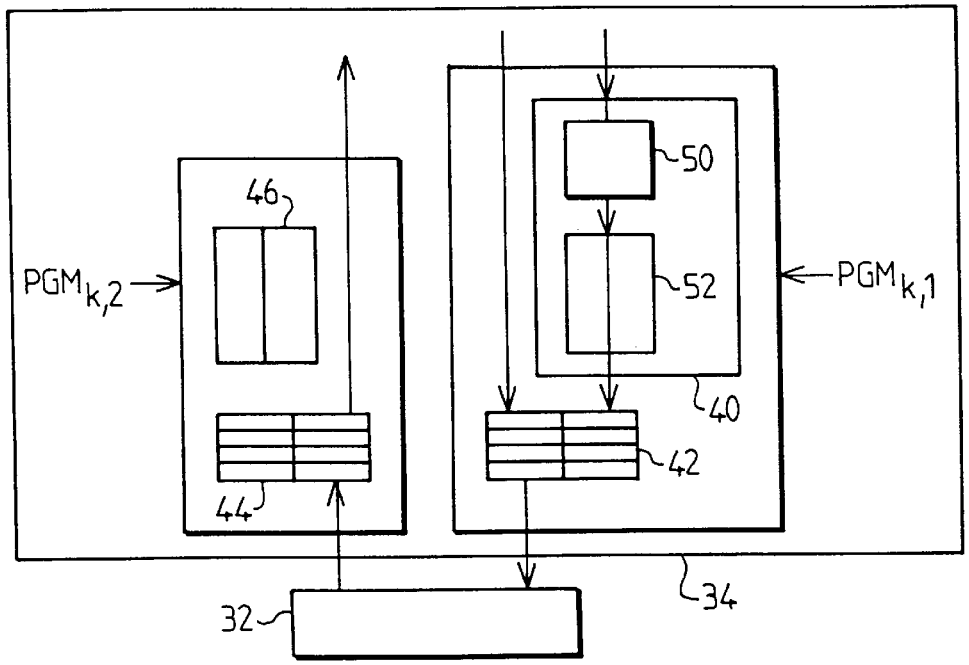
FIG. 5 is a diagram of an embodiment of an interface module of a demodulator according to the invention.

An embodiment of an interface module 34 is shown in detail in FIG. 5. It comprises selection means 40 for selecting data to be transmitted, a FIFO memory 42 for storing the data to be transmitted to the second module 32, a FIFO memory 44 for storing results provided by the second module, and transmission means 46 for transmitting the results stored in the memory 44 to the first module 30. This interface module 34 is controlled by $PGM_{K,j}$ programs, in particular by a writing program $PGM_{K,1}$ and by a reading program $PGM_{K,2}$.

The data received by the calculation unit $PU_K$ are either symbols containing N carriers or any data whatsoever which are to be transmitted to the second module 32. The selection means 40 are used when the data received is a symbol so as to select in this symbol the carriers to be transmitted to the second module 32 (only the carriers for control information only must be transmitted). The selection means 40 are controlled by the writing program $PGM_{K,1}$. They comprise a counter 50 and a table 52. The counter 50 numbers the carriers contained in the symbol in their order of appearance. The table 52 contains for each carrier number a transfer identifier It which indicates whether the corresponding carrier must or must not be transmitted to the second module 32, i.e. whether it should be copied into the FIFO memory 42.

The data which are not symbols and which are to be transmitted from the first module 30 to the second module 32 are copied directly into the FIFO memory 42.

The FIFO memory 42 contains on the one hand the data to be transmitted to the second module 30 and on the other hand a function identifier If for each data which indicates the source function and/or the destination function of the data. This function identifier If renders it possible for the second module 32 to know where the corresponding data is to be stored in the memory in view of its subsequent processing.

The second module 32 carries out one or several functions which lead to results. These results are stored in the FIFO memory 44 with a function identifier If which indicates the source function and/or the destination function of the result. This function identifier If renders it possible to control, in conjunction with the transmission means 46, the communication time slot at which a result must be transmitted to the first module 30.

The transmission means 46 are controlled by the reading program $PGM_{K,2}$. The program $PGM_{K,2}$ comprises instructions which indicate the type of communication which must take place at the communication time slot. Each type of communication corresponds to the transmission of a result of a certain type. The type of a result is indicated by the function identifier If which is associated therewith. The transmission means 46 are formed by a table of correspondences which indicates the correspondence between a type of communication and the type or types of results to be transmitted each time. For example, there may be two different types of communications $C_1$ and $C_2$, a communication of type $C_1$ corresponding to the transmission of a result whose function identifier If is equal to Z1 or Z2, and a communication of type $C_2$ corresponding to the transmission of a result whose function identifier is equal to Z3. The reading program $PGM_{K,2}$ consults the table of correspondences for each communication time slot so as to determine whether the function identifier for the result at the output of the FIFO memory 44 corresponds to the type of the communication. If this is the case, the result at the output of the FIFO memory is transferred to the first module with a validity identifier Iv equal to one. The reading program then moves to the next data. If it is not the case, the output result is not transferred (which means that it remains in the FIFO memory), and the validity indicator Iv associated with the current communication time slot is set for zero. This mechanism ensures that the results are transmitted at correct communication time slots with respect to the needs of the first module 30.

Figure 6:
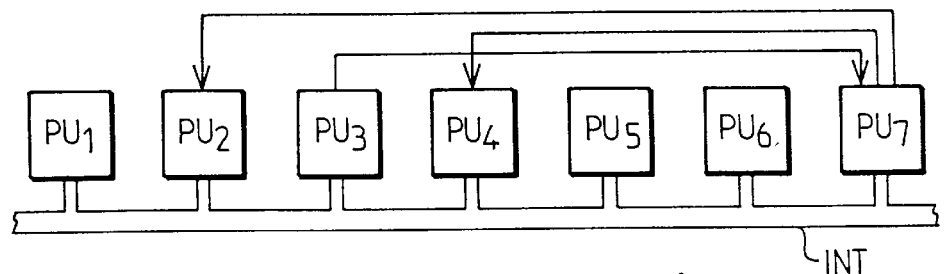
FIG. 6 is a diagram of an OFDM demodulator according to the invention.

FIG. 6 shows an example of an OFDM demodulator according to the invention. The calculation units of the first module 30 here carry out the demodulation functions at a frequency of the order of the sampling frequency. They are controlled by $PGM_{i,j}$ programs which are repeated with a frequency of the order of the sampling frequency. These calculation units each comprise essentially a calculation unit $PU_1$ which transposes the received signal into the baseband, a calculation unit $PU_2$ which carries out the treatments for the purpose of synchronization, a calculation unit $PU_3$ which carries out essentially an inverse Fourier transform operation for retrieving symbols, a calculation unit $PU_4$ for channel correction, a unit $PU_5$ which is a delay memory for storing a symbol during the channel correction operation, and a decoding unit $PU_6$. The interface module 34 and the second module 32 are integrated into a calculation unit $PU_7$. The second module 32 carries out the demodulation functions which take place at a frequency of the order of the symbol frequency. It is controlled by programs 36 which are repeated with a frequency of the order of the symbol frequency. The exchanges between the first module 30 and the second module 32 take place, for example, in the following manner:

the unit $PU_3$ transmits symbols to the unit $PU_7$, the unit $PU_7$ transmits results relating to the synchronization to the unit $PU_2$, the unit $PU_7$ transmits results relating to the channel correction to the unit $PU_4$.

Figure 7:
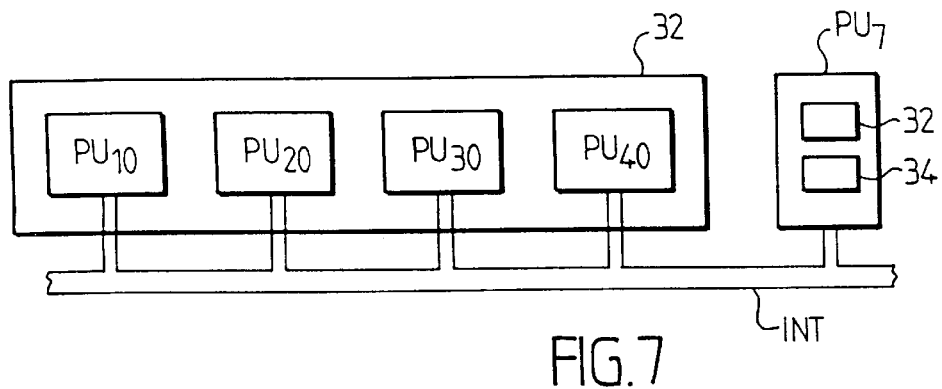
FIG. 7 is a diagram of a demodulator according to the invention for monocarrier modulations used in cable or satellite broadcasting systems for digital programs in accordance with the definitions of the standardization projects DVB.

FIG. 7 shows an example of a demodulator according to the invention for monocarrier modulations. This demodulator comprises a first module 30, a second module 32, and an interface module 34. The first module 30 essentially comprises a calculation unit $PU_{10}$ which transposes the received signal into the baseband, a calculation unit $PU_{20}$ which carries out functions for the purpose of synchronization, a calculation unit $PU_{30}$ which carries out filtering operations for retrieving the symbols, and a decoding unit $PU_{40}$. The interface module 34 and the second module 32 are integrated into a calculation unit $PU_7$. The calculation unit $PU_7$ is not used. All demodulation functions are carried out by the first module 30. The programs which control the operation of the calculation units $PU_{10}$, $PU_{20}$, $PU_{30}$, and $PU_{40}$ are repeated with a frequency of the order of the symbol frequency.

A programmable digital demodulator has been described which can be used for various types of modulations. The invention, however, is not limited to this example. It is in particular applicable to an OFDM demodulator which operates at a given symbol frequency and in which the communications (in particular the communication time slots at which the data must be transmitted) can be managed in a simpler manner than in the example described. It is clear that in that case the interface module may be simplified compared with the one described above.

Similarly, if all the data transmitted from the first module 30 to the second module 32 originate from the same calculation unit, for example if the only data transmitted are symbols provided by the unit which performs the Fourier transform calculations, it will be of no use to store a function indicator in the fifo memory 42 which indicates the source and/or destination function of the data.

What is claimed is:

1. A transmission system comprising at least a transmitter and a receiver, said receiver comprising a digital data demodulator, characterized in that said demodulator comprises:

a first module designed for carrying out first demodulation functions in accordance with at lest one first program ($PGM_{i,j}$) which is repeated with a first frequency, a second module capable of carrying out second demodulation functions in accordance with at least one second program which is repeated with a second frequency, and an interface module for exchanging data between said modules;

wherein the interface module comprises selection means for selecting the data to be transmitted to the second module; and wherein received data are formatted in blocks, each block containing useful data and control information, characterized in that the selection means select at least certain control information items and in that said second frequency is of the order of the frequency of said blocks.

2. A transmission system as claimed in claim 1, characterized in that said interface module comprises at least a memory of the FIFO type.

3. The transmission system of claim 2, wherein the selection means comprises a counter for numbering carriers contained in a symbol, in the order of appearance of those carriers, thereby providing carrier numbers.

4. The transmission system of claim 3, wherein the selection means further comprises a table containing for each carrier number, a transfer identifier that indicates whether the corresponding carrier must or must not be transmitted to the second module.

5. A receiver comprising a digital data demodulator, characterized in that said demodulator comprises:

a first module designed for carrying out first demodulation functions in accordance with at least one first program ($PGM_{i,j}$) which is repeated with a first frequency, a second module capable of carrying out second demodulation functions in accordance with at least one second program ($PGM_{K,j}$) which is repeated with a second frequency, and an interface module for exchanging data between said modules;

wherein the interface module comprises selection means for selecting the data to be transmitted to the second module; and wherein the receiver is designed for receiving data formatted in blocks, each block containing useful data and control information, characterized in that the selection means select at least certain control information items, and in that said second frequency is of the order of the frequency of said blocks.

6. The receiver of claim 5, wherein the interface module further comprises a first FIFO memory for storing data to be transmitted from the first module to the second module; and a second FIFO memory for storing results received from the second module.

7. The receiver of claim 6, wherein the selection means comprises a counter for numbering carriers contained in a symbol, in the order of appearance of those carriers, thereby providing carrier numbers.

8. The receiver of claim 7, wherein the selection means further comprises a table containing for each carrier number, a transfer identifier that indicates whether the corresponding carrier must or must not be transmitted to the second module.

9. A digital data demodulator, comprising:

a first module designed for carrying out first demodulation functions in accordance with at least one first program ($PGM_{i,j}$) which is repeated with a first frequency, a second module capable of carrying out second demodulation functions in accordance with at least one second program ($PGM_{K,j}$) which is repeated with a second frequency, and an interface module for exchanging data between said modules;

wherein the interface module comprises selection means for selecting the data to be transmitted to the second module; and wherein the demodulator is designed for receiving data formatted in blocks, each block containing useful data and control information, characterized in that the selection means select at least certain control information items, and in that said second frequency is of the order of the frequency of said blocks.

10. The digital data demodulator of claim 9, wherein the interface module further comprises a first FIFO memory for storing data to be transmitted from the first module to the second module; and a second FIFO memory for storing results received from the second module.

11. The digital demodulator of claim 10, wherein the selection means comprises a counter for numbering carriers contained in a symbol, in the order of appearance of those carriers, thereby providing carrier numbers.

12. The digital demodulator of claim 11, wherein the selection means further comprises a table containing for each carrier number, a transfer identifier that indicates whether the corresponding carrier must or must not be transmitted to the second module.

* * * * *